Feb. 15, 1927.
J. L. FEARING ET AL
1,618,072
TROLLEY
Filed Oct. 7, 1924
2 Sheets-Sheet 1
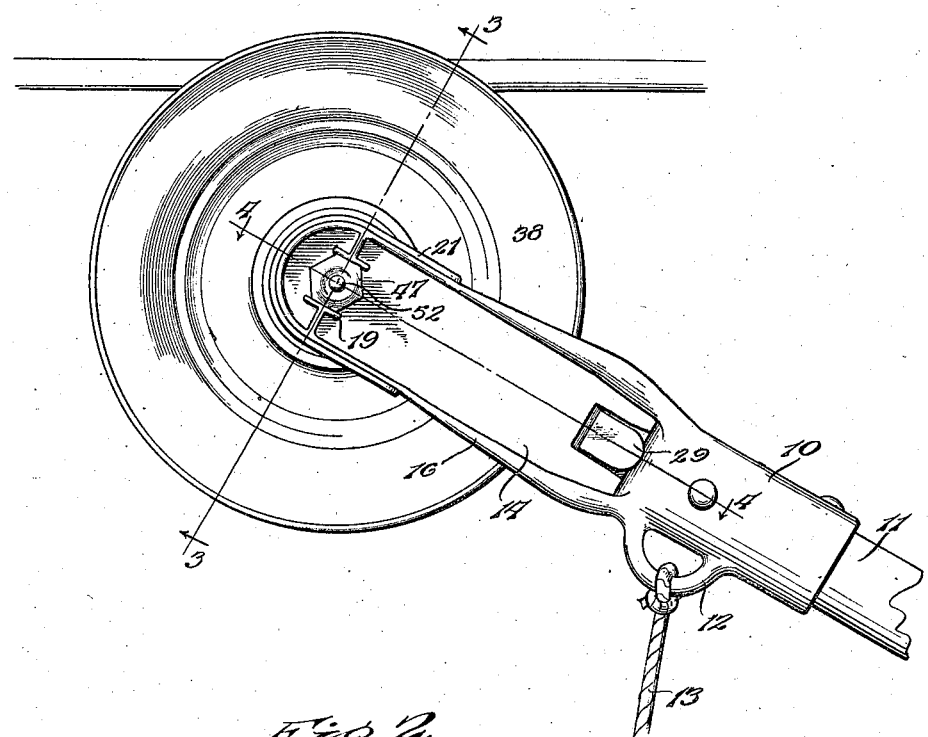
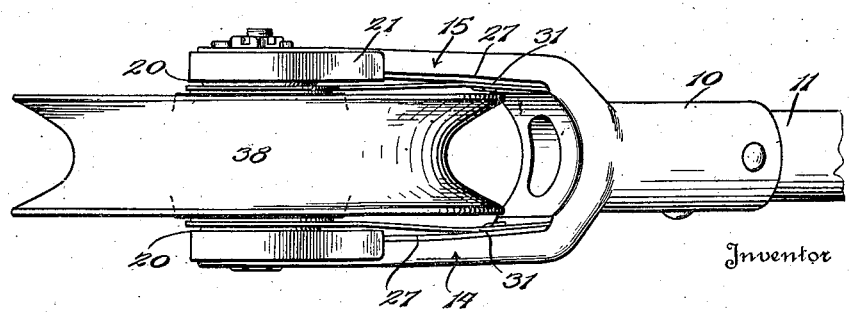
Inventor
Haskell F. Wellman
J. L. Fearing
By Lacey Tracy, Attorneys Feb. 15, 1927.
J. L. FEARING ET AL
1,618,072
TROLLEY
Filed Oct. 7, 1924    2 Sheets-Sheet 2
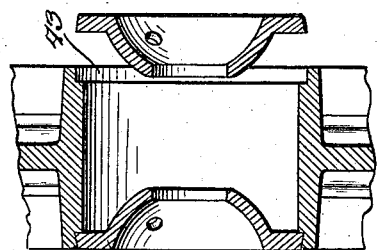
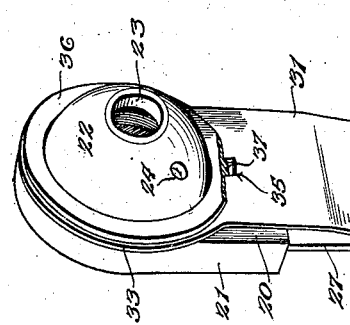
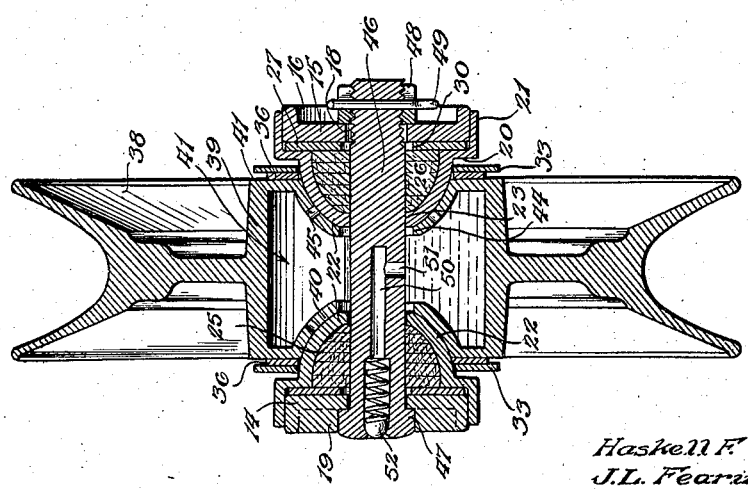
Inventor
Haskell F. Wellman
J. L. Fearing
By
Lacey Morey, Attorneys Patented Feb. 15, 1927.

1,618,072

UNITED STATES PATENT OFFICE.

JOHN L. FEARING AND HASKELL F. WELLMAN, OF ASHLAND, KENTUCKY, ASSIGNORS TO THORNTON TROLLEY WHEEL CO., INC., OF ASHLAND, KENTUCKY, A CORPORATION OF KENTUCKY.

TROLLEY.

Application filed October 7, 1924. Serial No. 742,193.

This invention relates to an improved trolley and seeks, among other objects, to provide a device of this character wherein the bearings and journals for the trolley will be effectually lubricated, wherein said bearings and journals will be so formed that they will tend to retain their shape and resist wear so that the trolley wheel will at all times run true, wherein means will be provided for pressing the bearings into the journals for automatically taking up wear as well as preventing the loss of lubricant, and wherein the bearings may be interchanged when worn, to the end that the trolley will be characterized by exceptional efficiency and a capability of long service.

The invention seeks, as a further object, to provide a trolley which may be readily assembled, wherein but a single bolt will be employed for holding the parts in assembled relation, and wherein the nut of said bolt may be adjusted for positively taking up wear occurring between the bearings and journals of the trolley wheel.

And the invention seeks, as a still further object, to provide a trolley employing grease reservoirs both for the bearings and journals of the trolley, and wherein said bearings as well as the wheel may be readily removed.

Other and incidental objects will appear hereinafter.

In the drawings:

Figure 1 is a side elevation of our improved trolley,

Figure 2 is a top plan view of the device,

Figure 3 is a vertical sectional view on the line 3—3 of Figure 1, looking in the direction indicated by the arrows, Figure 4 is a sectional view on the line 4—4 of Figure 1, looking in the direction indicated by the arrows, Figure 5 is a perspective view showing one of the bearing plates employed, and associated parts, and Figure 6 is a fragmentary sectional view showing a slight modification of the invention.

In carrying the invention into effect, we employ a harp which is formed with a socket 10 to receive a trolley pole, as conventionally illustrated at 11, and formed on the socket at its lower side is an eye 12 to receive a trolley rope as indicated at 13. Extending from the socket are parallel fork arms indicated for convenience at 14 and 15, which are provided with marginal reinforcing flanges 16, and formed in said arms at their inner ends are, as particularly shown in Figure 4, medial slots 17 while near their outer ends the arms are provided with alined openings 18. Formed on the arm 14 at opposite sides of the opening 18 therein are, as shown in Figure 1, parallel stop lugs 19.

Removably fitting the outer ends of the fork arms 14 and 15 of the harp are bearing plates 20 provided at their outer sides with flanges 21 extending from the edges of said plates to overlie the flanges 16 of said arms, and extending from the plates at their inner sides are substantially hemi-spherical bearings 22 which, as shown in detail in Figure 5, are formed with axial openings 23 as well as with lubricant passages 24. The bearings 22 are open at their larger ends and provide grease reservoirs 25 in which are disposed substantially hemispherical packings 26 of felt or other approved material. Fitting in the flanges 21 of the plates to overlie the outer sides of said plates are flat bearing springs 27 from the inner end portions of which are struck medial inwardly offset tongues 28 and formed on the springs at their inner ends are somewhat wider tongues 29 alining with the tongues 28. As shown in Figure 4, the outer ends of the springs overlie the outer ends of the reservoirs 25 for retaining the packings 26 therein and formed in said springs are openings 30 alining with the openings 23 of the bearings 22. Overlying the plates 20 at their inner sides are flat contact springs 31 which, at their inner end portions, are bent to seat flat against the inner ends of the springs 27 and formed on the springs 31 at their inner ends are tongues 32 registering with the tongues 29. At their outer ends, the contact springs are provided with contact rings 33 freely surrounding the bearings 22 of the bearing plates, and formed in said springs near their inner ends are openings 34 accommodating the tongues 28 of the springs 27. These tongues thus serve to connect the contact springs with the bearing springs 27 so that the bearing plates 20 are held between the outer end of said springs, a pair of the springs and each of the bearing plates forming, as suggested in Figure 5, a unit which may be bodily assembled upon either of the fork arms 14 and 15. This assembly is accomplished simply by slipping the bearing plates over the outer ends of the fork arms and coincidently directing the registering tongues 29 and 32 of the springs through the slots 17 at the inner ends of said arms when the springs will coact with the arms for removably securing the bearing plates thereon. The assembled bearing plates and springs may, of course, be removed with equal facility when, by flexing the springs 31 away from the bearing plates so that the contact rings 33 will clear the bearings 22, the bearings may be pulled endwise from between the free ends of the springs. Removal of the bearing plates may thus be easily accomplished and, in this connection, attention is directed to the fact that since the bearing plates are identical, said plates may be interchanged. Accordingly, should the bearings 22 of the plates become worn at their upper sides, the bearing plates may be reversed to present fresh surfaces of the bearings at the points where the greatest wear occurs. Formed in the contact springs 31 at the inner sides of the rings 33 are notches 35 and freely surrounding the bearings 22 are contact washers 36 provided at their outer sides with lugs 37 engaging in said notches for locking the washers against rotation.

Journaled between the bearings 22 of the bearing plates 20 is a trolley wheel 38. This wheel is provided with a hollow hub 39 closed at its ends by substantially hemispherical journals 40 which are formed to fit the bearings 22, the hub providing a reservoir 41 between the journals. The journals 40 may be formed integral with the hub, in which case the hub is cored out to provide the reservoir 41, or, as shown in Figure 6 of the drawings, separate journals 42 in the nature of metal stampings, may be employed. In such instance, the hub is formed at its ends with annular channels 43 to snugly receive the peripheral flanges of the journals while, as shown at the left of Figure 6, after the journals have been pressed into position, the ends of the hub are preferably upset for securing the journals in position. Also, if desired, the hub may be formed at one end with an integral journal and closed at its opposite end by a separate journal like the journals 42, which are, of course, identical with the journals 40. Formed in the journals 40 are axial openings 44 somewhat larger than the openings 23 of the bearings and said journals are also preferably provided, as shown in Figure 3, with lubricant passages 45. In mounting the wheel, the pairs of springs 27 and 31 are first assembled upon the bearing plates 20, as previously described, and then the washers 36 are applied. The bearing plates are then assembled with the wheel so that the bearings 22 will rest in the journals 40 of the wheel, the wheel and bearings being then assembled upon the fork arms 14 and 15 of the harp. This latter operation is, of course, accomplished by directing the wheel between the fork arms and slipping the bearing plates over the outer ends of said arms, as previously described, while the tongues 29 and 32 of the springs 27 and 31 are coincidently directed through the slots 17 of said arms.

Extending through the registering openings 18 of the fork arms 14 and 15 of the harp, through the openings 30 of the springs 27, through the packings 26 and through the openings 23 and 44 of the bearings 22 and journals 40, is a bolt 46. At one end, this bolt is formed with a head 47 which, as shown in Figure 1, is snugly received between the lugs 19 of the arm 14 to coact therewith for locking the bolt against rotation, and screwed upon the bolt at its opposite end is a nut 48 preferably locked by a key 49. The single bolt 46 thus serves to secure all of the parts in assembled relation and formed in the bolt from the head end thereof is, as shown in Figure 3, an axial passage 50 from which leads a passage 51 opening through the periphery of the bolt into the reservoir 41 of the wheel hub. Normally closing the passage 50 at its outer end is a spring pressed plug 52.

In use, the packings 26 are soaked with grease while oil is introduced into the reservoir 41 of the wheel hub 39 through the passages 50 and 51 of the bolt 46. Accordingly, when the wheel is in operation, grease will feed through the passages 24 of the bearings 22 for lubricating the cooperating surfaces of said bearings and the journals 40 of the wheel. Rotation of the wheel will, of course, tend to throw the oil in the reservoir 41 away from the axis of said reservoir by centrifugal force. However, when the wheel is at rest, oil will flow from the reservoir through the openings 44 of the journals 40 and through the openings 23 of the bearings 22 for replenishing the packings with lubricant. Thus, the packings will be maintained in a saturated condition so that, at no time will the bearings and journals become dry and, of course, fresh oil may, without the necessity of removing the wheel, be introduced into the reservoir 41 through the passages of the bolt 46 from time to time. When the wheel is at rest oil will also flow from the reservoir 41 to enter through any of the openings 45 submerged, for directly lubricating the cooperating faces of the bearings and journals.

The springs 27, being arranged to overlie the outer ends of the bearings 22, will tend to prevent the loss of grease at the outer ends of the bearings. Furthermore, these springs are so shaped and are so mounted that they will exert a constant inward pressure on the bearing plates 20. The springs will, therefore, resist possible expansion of the packings and will serve to press the bearings 22 inwardly to snugly fit within the journals 40. These springs will, therefore, prevent any looseness and, as wear occurs between the bearings and journals, will automatically take up such wear. Furthermore, wear between these parts may be positively taken up by adjustment of the nut 48 on the bolt 46. The washers 36 are interposed between the rings 33 of the springs 31 and the ends of the hub 39 of the wheel to protect the rings against wear. Furthermore, these washers will tend to prevent escape of lubricant at the open ends of the journals 40. The springs 31 are so shaped and mounted that, as shown in Figure 4, these springs will constantly press the washers inwardly against the ends of the hub. Efficient electrical contact of relatively large area is thus established between the washers and the wheel hub so that current may flow from the trolley wire to the wheel and thence to the washers and through the springs 31 to the trolley harp. In thus providing an efficient path for current flow, pitting of the wheel as well as pitting of the bearings and journals is avoided.

Having thus described the invention, what we claim is:

1. A trolley including a harp having arms, bearings loosely fitting said arms, a wheel journaled between the bearings, and springs extending along the arms between said arms and the bearings and pressing the bearings to coact with the wheel.

2. A trolley including a harp having arms, bearing plates loosely fitting said arms and provided with hollow hemi-spherical bearings forming lubricant reservoirs, a wheel mounted between the bearings and provided with journals fitting said bearings, and springs extending between said bearing plates and the arms and acting on said plates for pressing the bearings into the journals of the wheel.

3. A trolley including a harp having arms provided with slots, bearing plates loosely fitting said arms and provided with bearings, a wheel journaled between said bearings, and springs provided at their inner ends with tongues engaged in said slots and extending at their outer ends between the plates and arms to act upon the plates for pressing the bearings toward the wheel.

4. A trolley including a harp having arms, bearing plates slidably fitting said arms and having bearings rising therefrom, a wheel having a hub journaled between said bearings, springs acting on the bearing plates for pressing the bearings to coact with the wheel hub, washers surrounding the bearings to bear against the hub, and other springs pressing the washers into engagement with the hub.

5. In a trolley, coacting bearing plates having bearings rising therefrom, springs overlying the plates at corresponding sides thereof, other springs overlying the plates at their opposite sides and engaged with said first mentioned springs to form units each supporting its bearing plate between the springs thereof, a harp removably mounting said units, and a wheel journaled between the bearings of the plates of said units.

6. In a trolley, coacting bearing plates having bearings rising therefrom, springs overlying the plates at corresponding sides thereof and provided with tongues, other springs overlying the plates at their opposite sides and provided with rings loosely surrounding said bearings as well as slots accommodating said tongues for connecting the springs with each other to form units each having its bearing plate mounted between the springs thereof, a harp removably mounting said units, and a wheel journaled between the bearings of the plates of said units.

7. In a trolley, coacting bearing plates having bearings rising therefrom, springs overlying the plates at corresponding sides thereof and provided near their inner ends with tongues as well as at their inner ends with other tongues, other springs overlying the opposite sides of said plates and provided with rings surrounding said bearings as well as slots accommodating the former tongues of said first mentioned springs, the latter springs being also provided at their inner ends with tongues overlying the tongues at the inner ends of the former springs and the springs being connected by said first mentioned tongues to form units each having its bearing plate mounted upon the springs thereof, a harp having arms loosely mounting said bearing plates and provided at their inner ends with slots accommodating the overlying tongues at the inner ends of said springs for removably mounting the units upon the arms, a wheel journaled between the bearings of said plates, said first mentioned springs acting on the plates for pressing the bearings to coact with the wheel, and washers interposed between said rings and the wheel and pressed by the latter springs to coact with the wheel.

In testimony whereof we affix our signatures.

JOHN L. FEARING.
HASKELL F. WELLMAN.